UNITED STATES PATENT OFFICE.

CLAUDIUS SEIGNOL, OF LYON, FRANCE.

PROCESS FOR THE DESTRUCTION OF HAIRS AND OTHER EXTRANEOUS MATTER IN FLOSS AND WASTE SILK.

974,440. Specification of Letters Patent. Patented Nov. 1, 1910.

No Drawing. Application filed July 22, 1910. Serial No. 573,275.

*To all whom it may concern:*

Be it known that I, CLAUDIUS SEIGNOL, chemist, a citizen of the French Republic, residing at 5 Rue Servient, Lyon, in France, have invented a certain new and useful Process for the Destruction of Hairs and other Extraneous Matter in Floss and Waste Silk, of which the following is a specification.

The process which forms the subject matter of the present invention has for its object the treatment of floss and waste silk of all kinds with a view to destroying the hairs, horsehairs, finger nails, and horny, gelatinous and the like substances, which the said waste silk may contain. This destruction of foreign animal matter which is effected without alteration of the waste silk treated, is obtained by the following treatments:—

1. A hot solution of alkaline sulfids in the quantity of water necessary for obtaining a solution of definite strength is made. Commercial sulfid of sodium to the amount of 5 kilograms per 5 liters of water may be employed, and then diluted with ordinary water, in order to obtain exactly 10 liters of solution. It is well to add to this solution a small quantity of vegetable oil, such as cotton seed- palm- olive- or colza oil, in the proportion of 1 to 2% in order to prevent an abnormal ungumming of the silk during its treatment. The oil is added to absorb the free soda which is almost always present in sulfid of sodium. The soda combines with the oil forming a soap which is less corrosive than the free alkali. The whole of the oil is never quite combined with the soda, it therefore floats on the bath and impregnates the waste silk which it mechanically preserves during the operation. Any pure or ordinary sulfids of sodium may be employed, or sodium compounds which will give sulfid of sodium. It is however preferable to employ as the alkaline sulfid calcined dried or fused sulfid of sodium. This sulfid, the sulfurated hydrogen content of which is double that of the ordinary or pure sulfids, may be employed in a quantity half as strong as the others. Further as it contains very little free soda, its use enables the proportion of oil employed, hereinbefore mentioned, to be diminished to a notable extent or in certain cases the addition of oil may be omitted altogether.

2. About 1½ liters of this mother liquor is poured into boiling water, so as to obtain a weak solution of 1 to 2½% alkaline sulfid. When the temperature is at from 70 to 86° centigrade, the waste and floss silk is rapidly immersed therein, maintaining by means of a steam coil or in any other suitable way, a constant temperature of from 50 to 70° centigrade. The duration of the immersion is generally an hour, but it is evident that it may be prolonged or diminished according to the nature of the hairs and other animal products which are to be eliminated. It is also possible to operate cold, but in this case it will be necessary to increase the concentration of sulfid to about 5 to 10% and also to increase the duration of immersion to 12 to 48 hours, according to the nature of the waste silk to be treated. This cold treatment although longer than the hot treatment is on the other hand less troublesome. It also allows of worms and chrysalids contained in the floss and waste silk to be destroyed to a certain extent, so that they disappear almost entirely in the subsequent washing. When the said products are sufficiently softened (which is ascertained by means of tests on samples), the floss and waste silk is quickly removed and immersed in water heated to about 60 to 80° centigrade. It is agitated in all directions, in order to break up the hairs which may have been more or less attacked, and it is washed freely in cold water in order to thoroughly eliminate the sulfids employed and remove the refuse of hairs and other animal impurities which have been reduced to the condition of dust. Instead of washing with cold water, and in order to avoid hand labor, the floss and waste silk may be also immersed in a suitably formed ungumming bath, and then washed after this operation. It is then only necessary to dry the floss and waste silk which is then utilized in the ordinary way.

I claim:—

A process for treating floss and waste silk with a view to the destruction of hairs, horsehairs, nails, and horny gelatinous or other substances which they may contain, such process consisting in subjecting the floss or waste silk to the action of weak solutions of alkaline sulfids with the addition of a small quantity of oil, then quickly washing in hot water and finally rinsing in cold water, in order to eliminate any trace of the sulfid employed and to remove the debris of hairs or other impurities of animal origin.

In witness whereof I have signed this specification in the presence of two witnesses.

CLAUDIUS SEIGNOL.

Witnesses:
 JEAN GERMAIN,
 GUILLAUME PIOCHE.